US 8,407,107 B2

(12) United States Patent
Kennedy

(10) Patent No.: US 8,407,107 B2
(45) Date of Patent: **\*Mar. 26, 2013**

(54) METHOD TO CREATE A CUSTOMIZED E-COMMERCE STORE

(75) Inventor: William Daniel Kennedy, Scottsdale, AZ (US)

(73) Assignee: Vcommerce Holdings, Inc., Celebration, FL (US)

( * ) Notice: Subject to any disclaimer, the term of this patent is extended or adjusted under 35 U.S.C. 154(b) by 639 days.

This patent is subject to a terminal disclaimer.

(21) Appl. No.: 12/624,727

(22) Filed: Nov. 24, 2009

(65) Prior Publication Data

US 2010/0138317 A1    Jun. 3, 2010

Related U.S. Application Data

(63) Continuation of application No. 09/407,124, filed on Sep. 27, 1999, now Pat. No. 7,634,427.

(51) Int. Cl.
*G06Q 30/00* (2012.01)
(52) U.S. Cl. .................. 705/26.81; 705/1.1; 705/28
(58) Field of Classification Search ............. 705/26.81, 705/1.1, 28
See application file for complete search history.

(56) References Cited

U.S. PATENT DOCUMENTS

| | | | |
|---|---|---|---|
| 5,712,989 A | 1/1998 | Johnson et al. |
| 5,740,425 A | 4/1998 | Povilus |
| 5,870,733 A | 2/1999 | Bass et al. |
| 5,878,416 A | 3/1999 | Harris et al. |
| 5,890,175 A | 3/1999 | Wong et al. |
| 5,897,623 A | 4/1999 | Fein et al. |
| 5,897,639 A | 4/1999 | Greef et al. |
| 5,899,980 A | 5/1999 | Wilf et al. |
| 5,909,492 A | 6/1999 | Payne et al. |
| 5,910,896 A | 6/1999 | Hahn-Carlson |
| 5,918,214 A | 6/1999 | Perkowski |
| 6,029,141 A | 2/2000 | Bezos et al. |

FOREIGN PATENT DOCUMENTS

WO    WO-0124089 A1    4/2001

OTHER PUBLICATIONS

In the US Patent and Trademark Office U.S. Appl. No. 09/407,124, Non-Final Office Action dated Apr. 2, 2002, 6 pages; and response dated Oct. 21, 2003, 12 pages.
In the US Patent and Trademark Office U.S. Appl. No. 09/407,124, Final Office Action dated Jun. 4, 2006, 6 pages; and response dated Oct. 29, 2004, 10 pages (RCE).
In the US Patent and Trademark Office U.S. Appl. No. 09/407,124, Non-Final Office Action dated Feb. 2, 2005, 6 pages; and response dated Aug. 8, 2005, 14 pages.
In the US Patent and Trademark Office U.S. Appl. No. 09/407,124, Final Office Action dated Oct. 12, 2005, 9 pages; and response dated Apr. 14, 2006, 12 pages (RCE).
In the US Patent and Trademark Office U.S. Appl. No. 09/407,124, Non-Final Office Action dated Jun. 20, 2006, 7 pages; and response dated Oct. 19, 2006, 8 pages.

(Continued)

*Primary Examiner* — Raquel Alvarez
(74) *Attorney, Agent, or Firm* — Patton Boggs LLP

(57) ABSTRACT

An electronic commerce system includes a host with two-way communication to a plurality of distributors. Each of these distributors offers an addressable inventory of merchandise that consists of discrete items. The host sorts the discrete items according to a class designation such that members of a same class are assigned a unique tag. A store builder may electronically request at least one of the unique tags. The host then creates a customized store with a unique name, look and feel, and product selection for the store builder. This store provides a consumer with access, via said distributor, to items assigned that unique tag.

14 Claims, 9 Drawing Sheets

OTHER PUBLICATIONS

In the US Patent and Trademark Office U.S. Appl. No. 09/407,124, Final Office Action dated Jul. 24, 2007, 6 pages; response dated Sep. 24, 2007, 6 pages; and second response dated Feb. 15, 2008, 9 pages (RCE).

In the US Patent and Trademark Office U.S. Appl. No. 09/407,124, Non-Final Office Action dated May 22, 2008, 6 pages; and response dated Sep. 19, 2008, 13 pages.

In the US Patent and Trademark Office U.S. Appl. No. 09/407,124, Final Office Action dated Dec. 3, 2008, 9 pages; and response dated Apr. 27, 2009, 12 pages (RCE).

In the US Patent and Trademark Office U.S. Appl. No. 09/407,124, Amendment After Notice of Allowance dated Aug. 25, 2009, 9 pages; and response dated Sep. 16, 2009, 3 pages.

Affina; "Now Anyone Can Have a Storefront—It's Free"; 1999.
Davis; "The Web's Trillion-Dollar Secret"; Business 2.0; Sep. 1999; pp. 84-124.
Fleishman; "No ExSKUses"; Business 2.0; Sep. 1999; pp. 77-78.
Gurley; "The Evolving World of W-Tailing"; CNETNews.com; Aug. 1999.
ICONOMY.COM; "The New World Iconomy"; 1999.
International Search Report for PCT/US000/26434 filed Sep. 27, 2000.
Kvitka; "Review: Maestro Conducts Sales Commerce Suite Orchestrates Online Orders and Inventory"; InfoWorld; v. 21, n. 7; Feb. 15, 1999; p. 71(1).
No Author; "iCat Commerce Online Opens for Business, Now Every Business in the World Can Have A Free Store on the Internet"; PR Newswire; Apr. 12, 1998.

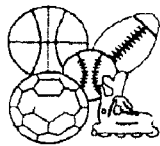
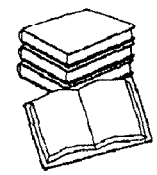
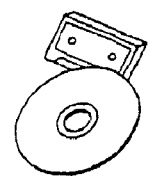
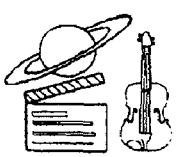

SUPERSTORES — 62
OFFER A BROAD SELECTION OF MERCHANDISE
ACROSS MANY PRODUCT CATEGORIES.
COMMISSION RANGE: 5%-25%

[SELECT A STORE TYPE ▼]
( SELECT )

SPORTS & OUTDOORS — 56
A WIDE SELECTION OF TEAM SPORTS AND OUTDOOR GEAR.
CHOOSE "ALL SPORTS" FOR THE WHOLE SELECTION OR
AN INDIVIDUAL SPORT FOR A SPECIFIC SPORT. — 58
COMMISSION RANGE: 10%-25% — 60

[SELECT A STORE TYPE ▼]
( SELECT )  64

BOOKS
HARDCOVERS, PAPERBACKS AND TAPES FROM
A DATABASE OF OVER 400,000 TITLES. CHOOSE
"ALL BOOKS" FOR THE WHOLE SELECTION OR AN
INDIVIDUAL TOPIC AREA.
COMMISSION RANGE: 5%-20%

[SELECT A STORE TYPE ▼]
( SELECT )

MUSIC
CDs AND CASSETTE TAPES FROM A DATABASE OF
OVER 107,000 TITLES. CHOOSE "ALL MUSIC" FOR THE
WHOLE SELECTION OR A FAVORITE TYPE OF SOUND.
COMMISSION RANGE: 7%-20%

[SELECT A STORE TYPE ▼]
( SELECT )

MOVIES
OUR MOVIE STORES INCLUDE VHS CASSETTES AND DVDs
FROM A DATABASE OF OVER 90,000 TITLES. CHOOSE "ALL
MOVIES" FOR THE WHOLE SELECTION OR AN INDIVIDUAL
GENRE FOR A SPECIFIC SELECTION OF TITLES.
COMMISSION RANGE: 8%-20%

[SELECT A STORE TYPE ▼]
( SELECT )

VIDEO GAMES
A SELECTION OF GAMES/ACCESSORIES FOR NINTENDO 64,
SONY, PLAYSTATION, GAMEBOY AND OTHER SYSTEMS.
CHOOSE "ALL GAMES" FOR THE WHOLE SELECTION OR
AN INDIVIDUAL BRAND.
COMMISSION RANGE: 2%-10%

[SELECT A STORE TYPE ▼]
( SELECT )

THEMES — 68
DO YOU HAVE A SPECIFIC AREA OF INTEREST? IF SO,
FOR YOU ENTHUSIASTS, WE ARE CONTINUALLY ADDING
STORES DEVOTED TO YOUR FAVORITE TOPIC. HERE ARE
JUST A FEW STORES WE HAVE COMPLETED. MORE TO COME!
COMMISSION RANGE: 5%-25%

[SELECT A STORE TYPE ▼]
( SELECT )

ELECTRONICS
CHOOSE FROM OVER 4,000 CONSUMER ELECTRONICS ITEMS
FOR THE HOME, OFFICE AND CAR.

[SELECT A STORE TYPE ▼]
( SELECT )

FIG.6

METHOD TO CREATE A CUSTOMIZED E-COMMERCE STORE

CROSS-REFERENCED TO RELATED APPLICATIONS

This application is a continuation application of U.S. patent application Ser. No. 09/407,124 filed Sep. 27, 1999 now U.S. Pat. No. 7,634,427, and is hereby incorporated by reference to the same extent as though fully contained herein.

BACKGROUND

This invention relates to a method of electronic commerce employing an integrated network of computers, such as the World Wide Web. More particularly, a host assigns an identification tag to diverse items available from a plurality of distributors. A store builder electronically interfaces with the host to create a customized store providing a plurality of diverse items having similar identification tags.

The large integrated network of computers, referred to as the Internet, has had a significant impact on commerce. Electronic commerce ("e-commerce") represents a significant source of traffic and customers for merchants. Consumer research has shown that among the reasons for consumers to shop on-line, that is via a network of computers, are convenience, selection and variety. Twenty-four hour access, superior product information and minimal travel time, combined with an almost infinite variety of products to choose from is a powerful incentive to try this medium.

The sale of goods and services over the Internet to households now represents about 5% of retail sales. It is expected that there will be an acceleration in e-commerce over the next several years. This growth will be driven primarily by a huge influx of on-line buyers as well as an increase in the frequency of purchases among experienced on-line buyers.

One traditional form of on-line shopping is destination oriented. A consumer desiring to purchase a specific product or service seeks out a retailer that carries the desired product or provides the desired service and goes directly to the retailer's web site to make a purchase. For example, a consumer may seek out Amazon.com if seeking to buy a book.

Another form of e-commerce is an affiliate program. A destination site, such as a web site drawn to a particular sporting team, directs consumers to retailers selling goods or services through a link to that retailer placed within the destination site. A sporting team destination site may provide electronic links to a seller of sneakers or autographed trading cards. The destination site, as an affiliate, typically receives a commission from resulting sales for referring traffic to the retailer. It is estimated that affiliate programs produce about 15% to 25% of an on-line retailer's traffic and sales volume.

The destination site, as affiliate, is at a disadvantage. Once the consumer is directed to the on-line retailer, the retailer typically requests sufficient information about the consumer that the retailer may contact the consumer directly regarding new product lines and/or sales thereby depriving the affiliate of additional commissions.

There remains a need for an on-line system of electronic commerce that readily directs the consumer to a wide variety of selected goods, yet allows the destination site to retain the customer relationship and to benefit from repeat purchases.

SUMMARY

Accordingly, it is an object of the invention to provide an e-commerce system that enables anyone with access to a computer and the Internet to create and then to operate a customized, fully stocked, on-line store quickly and at little or no cost to the store builder.

It is a feature of the invention that the store builder is able to create a store front with a unique name, a unique look and feel and a unique product mix. A further feature of the invention is that the creation of the store front and the administration of the store are conducted by the host at little or no cost to the store builder/owner. Rather, the store owner need only market the destination site.

It is another feature of the invention that a host provides a prospective store owner with a series of prompts to manufacture and customize a new on-line store. A further feature of the invention is that there is a minimal, or no, cost to a prospective store owner for the manufacture, customization or maintenance of an on-line store. A further feature of the invention is that when a consumer purchases an item at one of the customized on-line stores, the purchase price is divided between the distributor of that goods, the customized store owner and the owner of the host.

It is a further feature of the invention that administrative details are maintained by the host rather than the store owner. A further feature of the invention is that the stores are customizable after manufacture such that the store appearance or product mix may be readily changed by the store owner. Still another feature of the invention is that the customized store may be electronically linked to other web sites by the store owner.

Among the advantages of the invention are that the manufacture and maintenance of a customized on-line store are at low cost or no cost to the store owner. Further, the store is readily accessible to a consumer having electronic access to the World Wide Web. A further advantage is that the actual supplier of the goods is only partially discernable to the consumer whereby a consumer desiring to purchase additional items is more likely to return to the same customized on-line store. A further advantage of the system of the invention is that the administrative support provided by the host supports the sale of personalized goods and private label goods by the customized store owner.

Yet another advantage is that a single destination site support multiple products, therefore a consumer need learn only one method of on-line shopping to satisfy multiple needs and need not visit multiple sites with multiple electronic shopping requirements as with an affiliate program.

In accordance with a first aspect of the invention, there is provided an electronic commerce system that includes a host with two-way communication to a plurality of distributors, each of the plurality of distributors offers an addressable inventory of merchandise consisting of discrete items. The host has the capability to sort the discrete items from the plurality of distributors according to a class designation, wherein members of a same class are assigned a unique tag. A store builder with electronic access to the host is capable of requesting at least one unique tag. The host then creates a store for the store builder. This store provides a consumer with access, via said distributor, to items assigned that unique tag.

In accordance with a second aspect of the invention, there is provided a method for the manufacture of an e-commerce store. This method includes electronically accessing a host that electronically displays a plurality of store types, selecting a generic store type, setting up an account whereby the host recognizes a unique store owner, customizing the store appearance and product mix, devising a commission schedule whereby if a consumer provides a purchase price to purchase an item from the store, the purchase price is divided between a distributor of the item, the store owner and an administrator of the host.

The above stated objects, features and advantages will become more apparent to those skilled in the art from the description and drawings that follow.

BRIEF DESCRIPTION OF THE DRAWINGS

FIG. 6 illustrates an exemplary store building screen.

DETAILED DESCRIPTION

Figure 1:
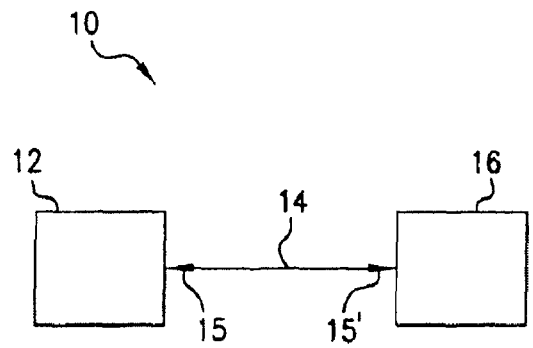
FIG. 1 illustrates in block diagram destination oriented e-commerce as known from the prior art.

FIG. 1 illustrates in block diagram a destination oriented e-commerce system 10 as known from the prior art. A consumer 12 communicates 14 with a retailer 16. By consumer it is meant an individual desiring to either purchase or receive information about a specific product or service. The individual may be acting on his/her own behalf or on the behalf of a corporate entity. A consumer may also be an intelligent machine, such as a computer programmed to purchase desired goods or services in response to a command, for example to restock the shelves of a grocery store once purchase of a product exceeds a specified threshold.

By retailer it is meant a person or corporate entity who satisfies the consumer's requests, typically in return for a financial consideration. A retailer is a branded seller meaning that the retailer intends for the consumer to remember the retailer and to seek out the retailer for additional goods or services.

The consumer 12 communicates with the retailer 16 electronically, by digital packets of data transmitted via the world wide web. Typically a computer operated by consumer 12 electronically communicates with a computer accessed by retailer 16 utilizing any suitable form of electronic communication. For example, transmission control protocol/internet protocol (TCP/IP) is widely used.

Communication 14 is two way, as indicated by directionality arrows 15, 15'. The consumer 12 is able to peruse the items available for sale by retailer 16 and make selections or inquiries. The retailer 16 can provide the consumer with the availability of the desired items and answers to specific queries. The consumer 12 may then order specific items on-line, typically utilizing a credit card or an electronic transfer of funds.

There are a number of problems with a destination oriented system. The consumer is captive to the goods and services offered by a single retailer 16. Such goods and services may be limited to a single brand or to a restricted level of quality. While the consumer 12 may conduct a search of the World Wide Web for other retailers having goods or services more closely meeting the customer's expectations, such a search may be time-consuming and contains no guarantee of success. Further, the consumer's confidence in the honesty of remote retailers and/or previously unheard-of retailers, may be limited.

From the retailer's standpoint, it is expensive to setup and maintain a computer system capable of supporting e-commerce. The retailer must provide products to sell, provide transactional processing and fulfillment of orders, provide customer service and manage returns. The e-commerce technology is complicated, requiring the services of skilled programmers. The volume of traffic visiting the retailer's web site, is variable and, at times, may be insufficient to meet the retailer's costs.

Figure 2:
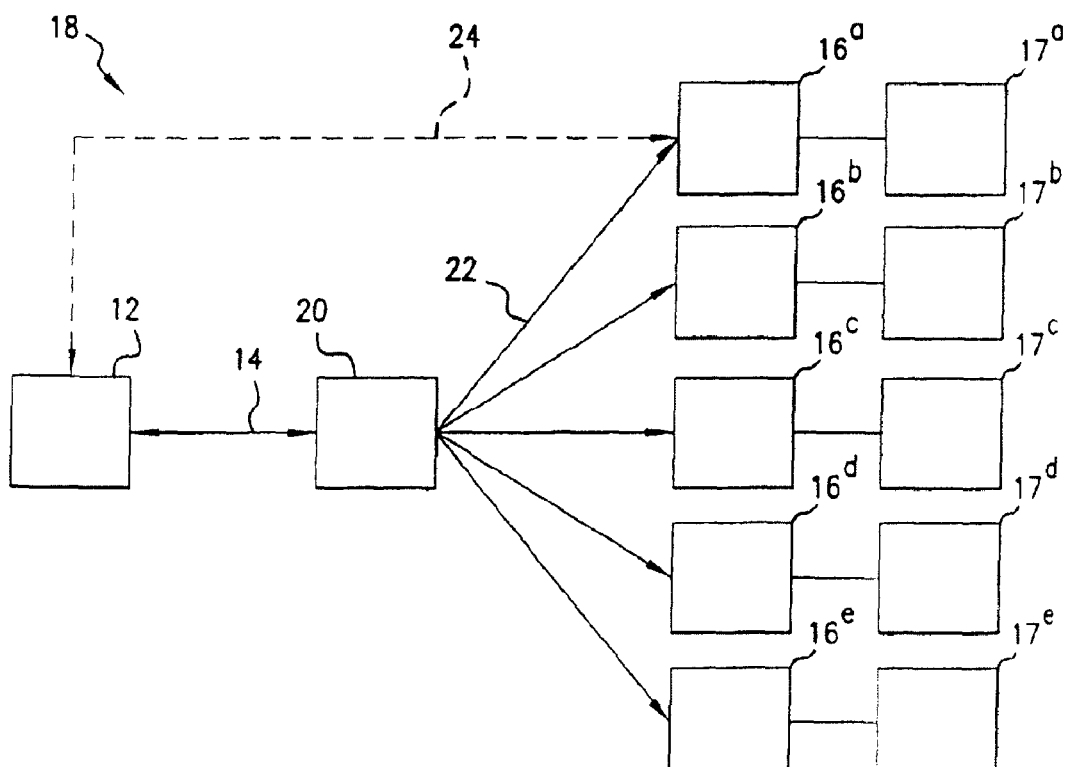
FIG. 2 illustrates in block diagram an affiliate program for e-commerce as known from the prior art.

FIG. 2 illustrates an affiliate program for e-commerce 18 as known from the prior art. In the affiliate program 18, a consumer 12 electronically communicates 14 with a destination site affiliate 20 via an appropriate digital electronic communication protocol. The destination site affiliate web site illustrates a number of goods and services available from a variety of retailers $16^a$-$16^f$. If the consumer 12 informs the destination site affiliate 20 of a desire to purchase a listed product or service, the destination site affiliate 20 links 22, electronically transfers, the consumer 12 to the proper retailer's web site. If the consumer 12 then decides to purchase from an affiliate retailer, for example $16^a$, the consumer 12 pays the retailer $16^a$ directly. Retailer $16^a$ then arranges with a distributor, for example $17^a$ to ship the purchased goods to consumer 12. In some embodiments, the retailer also functions as the distributor or there may be multiple distributors supporting a single retailer. The owner of the affiliate destination site 20 receives a commission that is typically between 5% and 10% of the sale price.

While advantageous to the consumer 12 in that many retailers are accessible via a single affiliate destination site 20, the affiliate destination site risks losing the consumer 12 as a customer for future sales. During the first sale, retailer $16^a$ will typically obtain sufficient information about the consumer to contact the consumer 12 directly and the affiliate destination site 20 is not needed for repeat sales causing the site owner to lose out on future commissions.

Figure 3:
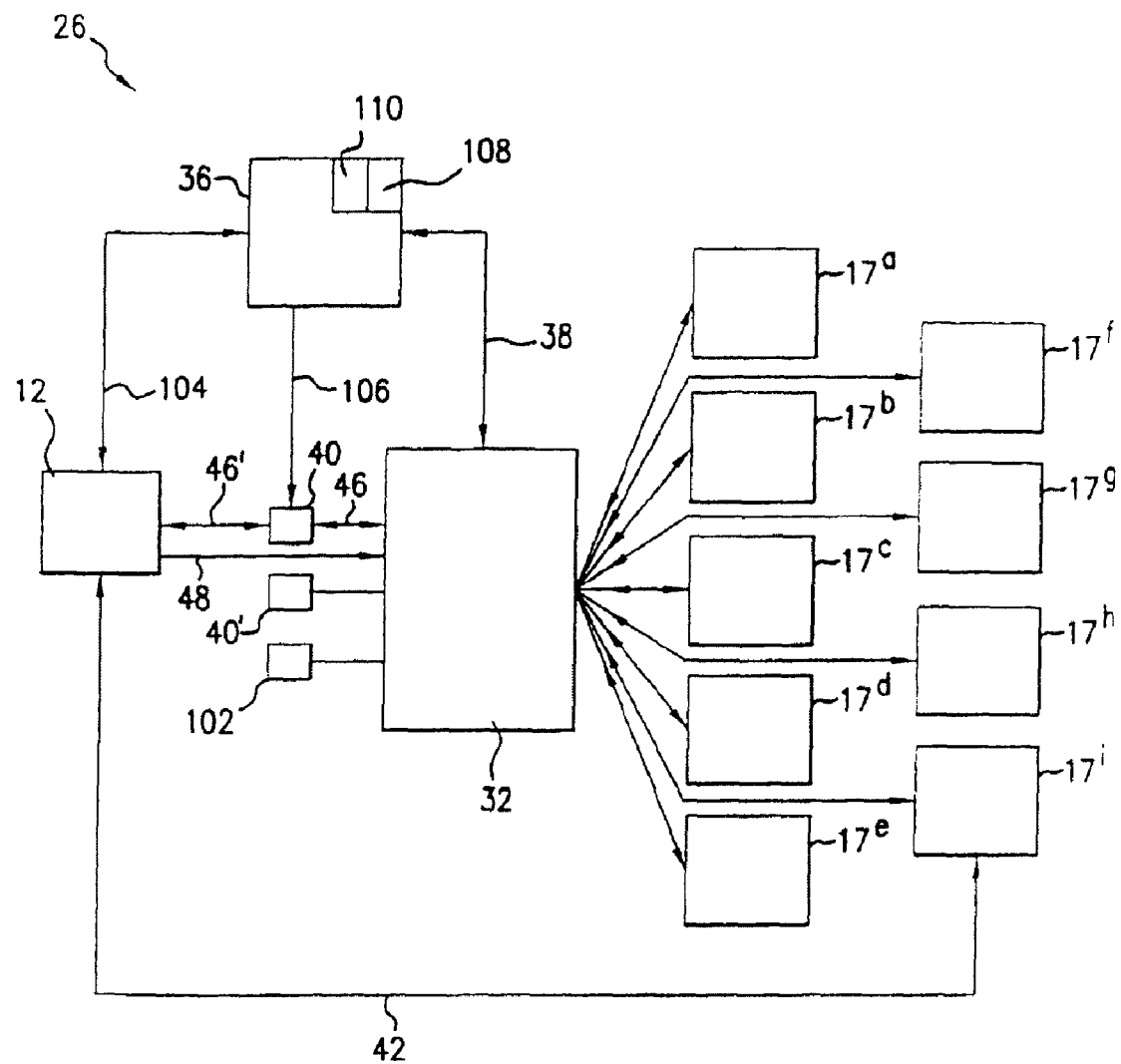
FIG. 3 illustrates in block diagram a customized e-commerce system in accordance with a first embodiment of the invention.

FIG. 3 illustrates a first embodiment of an electronic commerce system 26 in accordance with the invention. A host 32 has two-way communication 34 with a plurality of distributors $17^a$-$17^i$. While FIG. 3 illustrates nine distributors as an exemplary number, the actual number of distributors in two-way communication 34 with host 32 is not fixed and may number in the hundreds or thousands. It is anticipated that the number of distributors will vary with the trend being towards increasing the number of distributors. Each distributor $17^a$-$17^i$ has an addressable inventory of merchandise consisting of discrete items. Addressability may be by UPC number (Universal Product Code), an internally developed product code or any other means by which a specific product may be readily identified. Preferred addressability is by a customized product code to provide a desired degree of uniqueness.

The distributors will have different items available, for example, distributor $17^a$ may carry books while distributor $17^b$ may carry home furnishings. Multiple distributors may carry similar goods however from different manufacturers. For example, distributor $17^c$ may carry brand name electronics from one or two suppliers while distributor $17^d$ may carry similar electronic products from different brand name manufacturers.

Preferably, the two-way communication 34 is in the form of a digital data link between a computer maintained by the host 32-and computers maintained by distributors $17^a$-$17^i$. Such a digital link is typically referred to as an electronic data interchange (EDI) link and enables the electronic satisfaction of orders including payment and shipping. Alternatively, the two-way communication may involve a human interface, such as by facsimile or telephone.

The host 32 has the capability to sort the discrete items inventoried by all of the plurality of distributors $17^a$-$17^i$ according to class designation. Members of a same class are assigned a unique tag. For example, all table lamps may be assigned one identification tag while all race car memorabilia may be assigned a different identification tag. A table lamp encompassing race car memorabilia would be assigned both unique identification tags. An exemplary identification tag is a mixture of product categories, assigned key words and other identifying characteristic data.

A store builder 36 electronically communicates 38, typically in a computer-to-computer digital protocol, with the host 32. The store builder 36 is capable of requesting of the host 32 at least one of the unique identification tags. The host 32 then creates a store 40 for the store builder 36. The store 40 provides a consumer 12 with access to the items assigned the unique identification tag. Should the consumer 12 desire to purchase a displayed item, the item is shipped 42 from one of the distributors, for example $17^i$, to the consumer. Since the consumer 12 has primary discernable access to the store 40, it is anticipated that future sales will be through store 40 generating additional revenue for store builder 36, a distinct advantage over an affiliate program.

Figure 4:
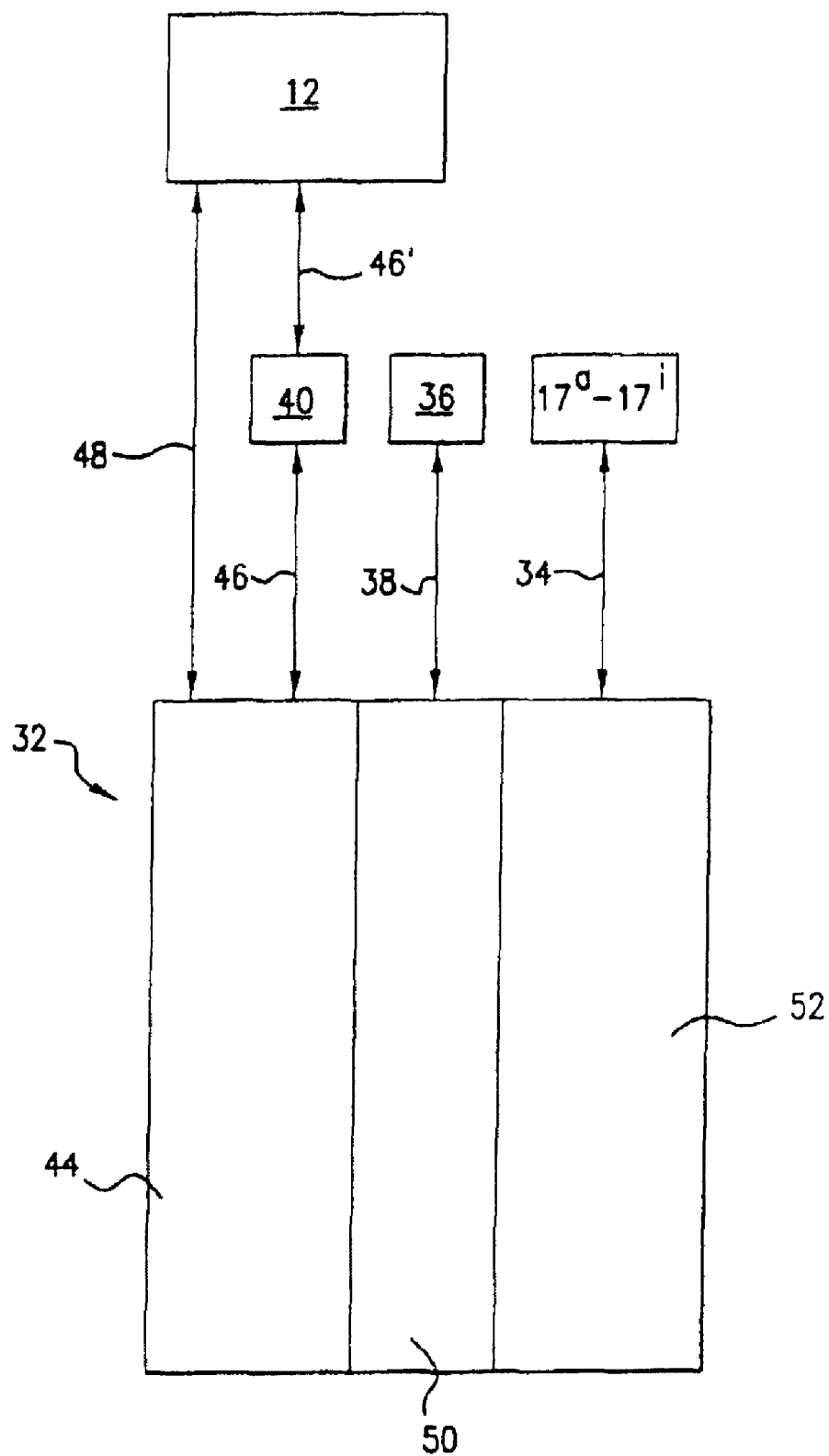
FIG. 4 illustrates functions of the host in block diagram.

FIG. 4 illustrates functions of the host 32 in block diagram. The host 32 has a front end portion 44 that communicates 46, in digital electronic protocol, via store 40 with consumer 12. Along communication link 46, 46', are transmitted product displays, product pricing and answers to customer queries. The store 40 has been customized, as described below, by the store owner such that the customer views store 40 as a unique stand-alone entity that is worthy of repeat visits and repeat purchases.

Among the administrative functions of the host are order taking, store creation, hosting of customer service, transaction processing, order fulfillment and returns as well as system maintenance and up-grades.

Front end portion 44 receives both orders and payments from consumer 12 as well as return requests and other administrative matters. Order taking, payments, customer service inquiries and responses, and return requests are digitally communicated 48 directly from the customer 12 to the host 32. Although communicating with the host for these administrative details, the consumer's primary activity is with the store 40 causing the host 32 to be of limited discernability to consumer 12. Direct communication link 48 frees the store 40 from the need to provide administrative support.

In a preferred embodiment, the administrative details are conducted under store branding rendering the host indiscernible to the consumer. For example, even if customer service is provided through host, the customer service representatives as well as customer service data screens appear to the consumer as originating with the store.

An administrative portion 50 of the host 32 communicates 38 with store owner 36. The administrative portion 50 allows the store builder 36 to build the customized store 40 and to modify the store 40 as desired. In addition, the administrative portion 50 communicates messages to the store owner 36, adjusts prices, monitors, sales and commission performance and allows the store owner to change the product mix.

A back end portion 52 communicates 34 with the plurality of distributors $17^a$-$17^i$. The back end portion 52 transmits orders and payments to the appropriate distributor and verifies that requested items have been shipped. In addition, the back end portion 52 assigns the unique identification tag to each item available from the plurality of distributors to enable store owner 36 to create the customized store 40.

To develop a data base of goods, unique identification tags are assigned by any suitable process or combination of processes. For example, a vendor may provide a data base with vendor codes for available merchandise. The host could then convert the vendor codes to host codes and enter the products into the host data base. Alternatively, a vendor's product catalog may be digitally scanned into the data base and the host codes manually entered. In another alternative, an automated process may assign the vendor goods with host product codes based on key words and an electronic characterization of the data.

There is also communication within the host between the portions 44, 50, 52. For example, when a customer order is received at the front end portion 44, that order is communicated to the back end portion 52 for transmittal to the appropriate distributor. When payment is received, the store owner's commission is forwarded to the store owner 36 and the purchase price communicated to the distributor 17.

Figure 5:
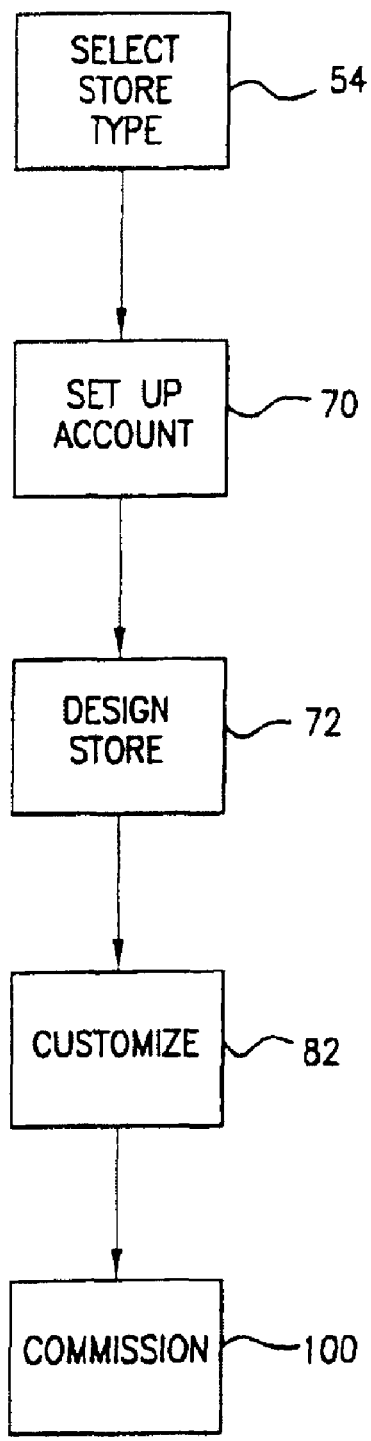
FIG. 5 illustrates the construction of a customized e-commerce store in flow chart format.

FIG. 5 illustrates in flow chart format a series of steps by which a prospective store owner builds a customized e-commerce store in accordance with the invention. This is done at either a nominal cost, or preferably, no cost to the store builder. The prospective store owner electronically communicates with the host by logging on to the host's web site on the World Wide Web. The host's web site has an electronic address, URL (Uniform Resource Locator), that provides accessibility to persons on the Internet. The prospective owner obtains the host's URL through any appropriate means such as advertisements (print or electronic), word of mouth or searching on the Internet. Once the prospective store owner accesses the host, a preliminary home page describing the functions and capability of the host and links the prospective store owner to a store building web site.

At the store building web site, the prospective store owner is first prompted to select a store type 54. Different types of stores available to the prospective store owner appear on the prospective store owner's computer screen. FIG. 6 illustrates an exemplary store building screen. The prospective store owner is provided with a number of different generic store types 56 and a description 58 of each generic store type. The anticipated commission range 60 is also specified. The price paid by the consumer for goods purchased from the customized store has three components. First is the purchase price which is transmitted from the host to the distributor. Second is the commission, a percentage of the purchase price that is paid by the host to the store owner. The third component is retained by the host for operating expenses and profit to the host owner.

The generic store may be a superstore 62, or a themed store drawn to sports, movies, etc. Further refinement in the type of store is achieved by clicking, pointing a computer mouse button and selecting, on a select store type button 64.

Figure 7:
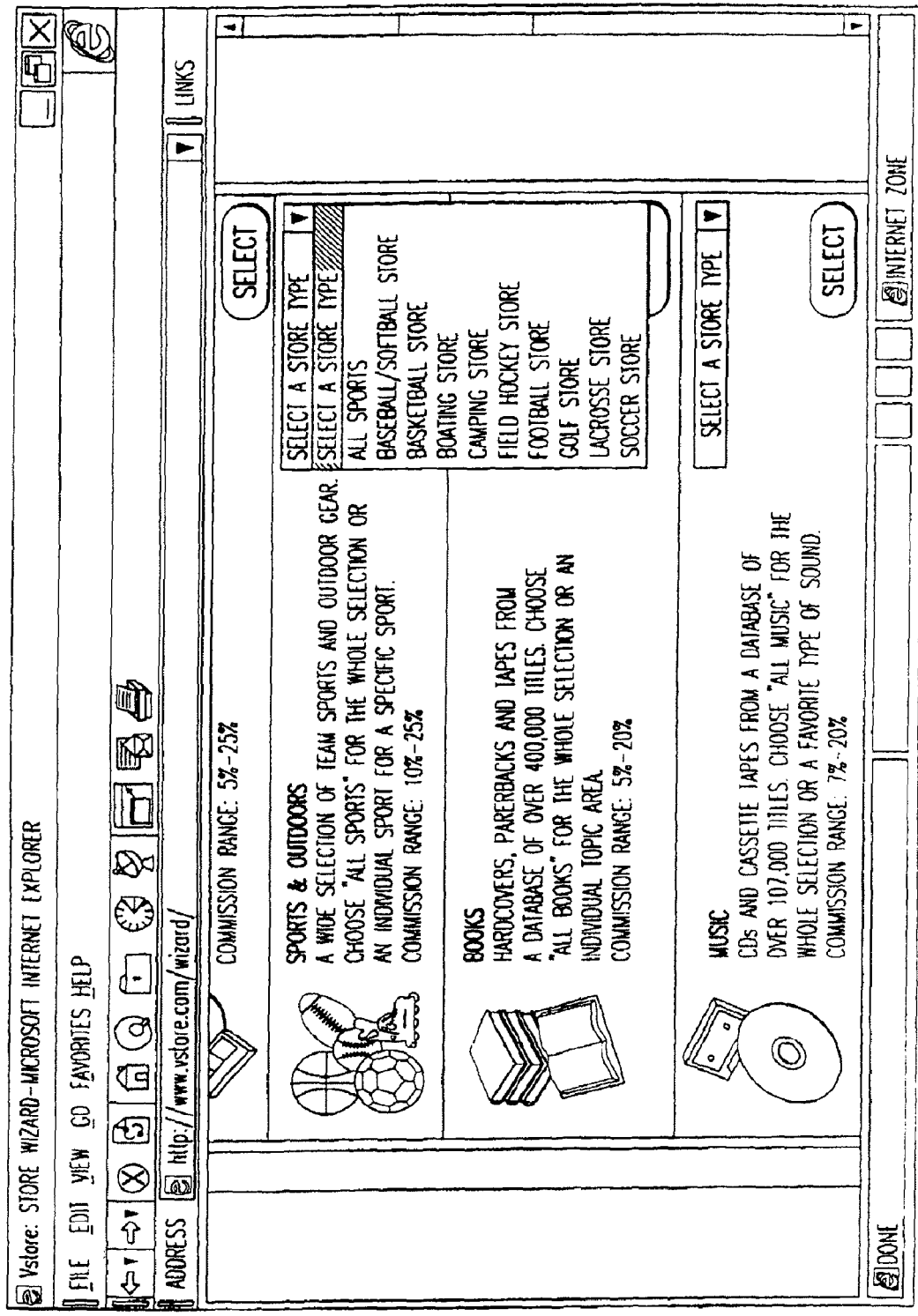
FIG. 7 illustrates the screen of FIG. 6 further including a pop-up screen having store subsets.

Referring now to FIG. 7, clicking on the select store button opens a pop-up screen 66 that further refines the generic store to a specialty store 67. For example, rather than a generic sporting goods store, the customized store may deal exclusively with soccer merchandise or camping merchandise.

With reference back to FIG. 6, a generic superstore 62 may appeal to a broad base of consumers, but may be subject to competition from other stores, affiliates and retailers. A more specialized store, such as a sporting goods store, will have more selective appeal to a smaller group of consumers, but face less competition. A customized specialty store, such as a camping store, has an even smaller group of interested consumers, but since these consumers likely have an interest in the products offered, the number of visitors that make purchases is expected to be high compared to more broadly defined types of stores.

As a further alternative, the store may be based on a specific theme 68, for example, Elvis memorabilia. Alternatively, a key word or series of key words may be utilized to construct the store. For example, the keyword "Australia" would lead to the creation of a customized store themed around the country Australia.

Examples of descriptions for stores, including superstores 62, stores of specific theme 68, generic type stores 56, their descriptions 58, and commissions 60 include the following:

Superstores
  Offers a broad selection of merchandise across many product categories.
  Commission range: 5%-25%
Sports & Outdoors
  A wide selection of team sports and outdoor gear.
  Choose "all sports" for the whole selection or an individual sport for a specific sport.
  Commission range: 10%-25%
Books
  Hardcovers, paperbacks, and tapes from a database of over 400,000 titles.
  Choose "all books" for the whole selection or an individual topic area.
  Commission range: 5%-20%
Music
  CDs and cassette tapes from a database of over 107,000 titles.
  Choose "all music" for the whole selection or a favorite type of sound.
  Commission range: 7%-20%
Movies
  Our movie stores include VHS cassettes and DVDs from a database of over 90,000 titles.
  Choose "all movies" for the whole selection or an individual genre for a specific selection of titles.
  Commission range: 8%-20%
Video Games
  A selection of games/accessories for Nintendo 64™, Sony™, Playstation™, Gameboy™, and other systems.
  Choose "all games" for the whole selection or an individual brand.
  Commission range: 2%-10%
Themes
  Do you have a specific area of interest? If so, for you enthusiasts, we are continually adding stores devoted to your favorite topic. Here are just a few stores we have completed. More to come!
  Commission range: 5%-25%
Electronics
  Choose from over 4,000 consumer electronics items for the home, office, and car.

Referring back to FIG. 5, the prospective store owner is next prompted to set up an account 70 whereby the host recognizes and is enabled to securely communicate with the prospective store owner. The account information includes the customized store owner's name, email address and a secure password. The password is utilized when an owner of a customized store seeks to communicate with the host about the store, for example, to modify the store contents or appearance or to get an accounting of earned commissions.

Figure 8:
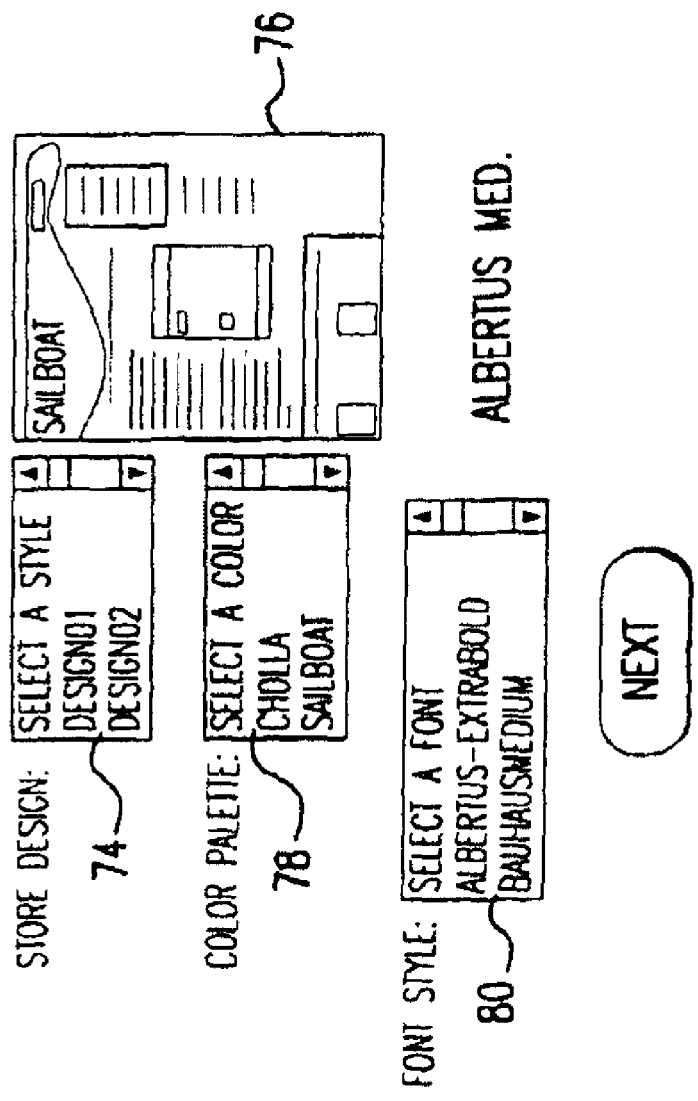
FIG. 8 illustrates an exemplary store design screen.

The store owner is then prompted to design a store, customizing how the store will appear on a consumer's computer screen. As illustrated in FIG. 8, the prospective store owner is prompted to select from one of a number of store designs 74. A preview window 76 provides the prospective store owner with a preview that may be readily adjusted as needed. The store design 74 establishes the top and bottom border designs and the positioning of text.

A color palette 78 enables the prospective store owner to select the dominant colors for the top and bottom border designs and, in some selections, a background color for highlighting the text. A font style 80 enables the store owner to choose a distinctive font.

There are multiple selections within each of the three variables, store design 74, color palette 78 and font style 80. This enables a large number of unique stores to be formed. For example, if there were five store designs, 15 colors and 20 font styles, this would enable the formation of 5×15×20=1500 unique store appearances. The store name and selected goods provides further distinctiveness. This example is not intended to limiting, other customization, such a graphics imported by the store owner, may be included. In addition, the number of designs, colors and fonts is for example only.

Figure 9:
FIG. 9 illustrates an exemplary store customization screen.

Referring back to FIG. 5, the store owner is next prompted to customize 82 the store. FIG. 9 illustrates an exemplary customization screen. The store owner is prompted to select a unique store name 84 and a store slogan 86. As a default, the prospective store owner's name and the word "store" may be combined as the store name and a slogan generated by the host utilized. Further customization allows for a home page narrative 88 to make the store more interesting to consumers. The text within narrative 88 reads, for example: "Whether you are striking out on some daring adventure or simply sleeping out in the backyard, we've got the goods you need. You won't need to hire a scout to find what you need . . . choose a category of products to begin browsing" (max. 800 characters).

To provide the customized store with a URL, the host provides a number of selectable" domain names 90 that have been cleared for use by the host. The prospective store owner than appends a unique store directory 92 to the domain name completing the URL.

If the prospective store owner has other sites that may be of interest to consumers, an electronic return link 94 may be created enabling consumers to access the other sites with a click of the computer mouse. A link may also be created at these other sites to allow the consumer to access the customized store.

Text block 83 reads, for example: "Here you can further customize your store by providing a unique name, slogan, and homepage text. You can also choose a domain name/directory combination (used to construct your store's URL) and add a permanent return link back to an existing site. We have filled in some of the information for you, but feel free to change any of it. Simply make your changes in the boxes below and click 'next'."

Text block 85 reads, for example: "This text shows up on the homepage of your store. You can modify the text below, or just use it as it is."

Text block 87 reads, for example: "Select from any of our different domain names to host your store. Select the domain name you would like to use and then enter in the name of the directory you would like to have within that domain (e.g., www.vstoresdvds.com/mystore). Please do not use any spaces."

Text block 89 reads, for example: "If you have an existing site, and you would like to have a link from your store back to your site, please check the box below and enter a link to the desired page of your site."

Figure 10:
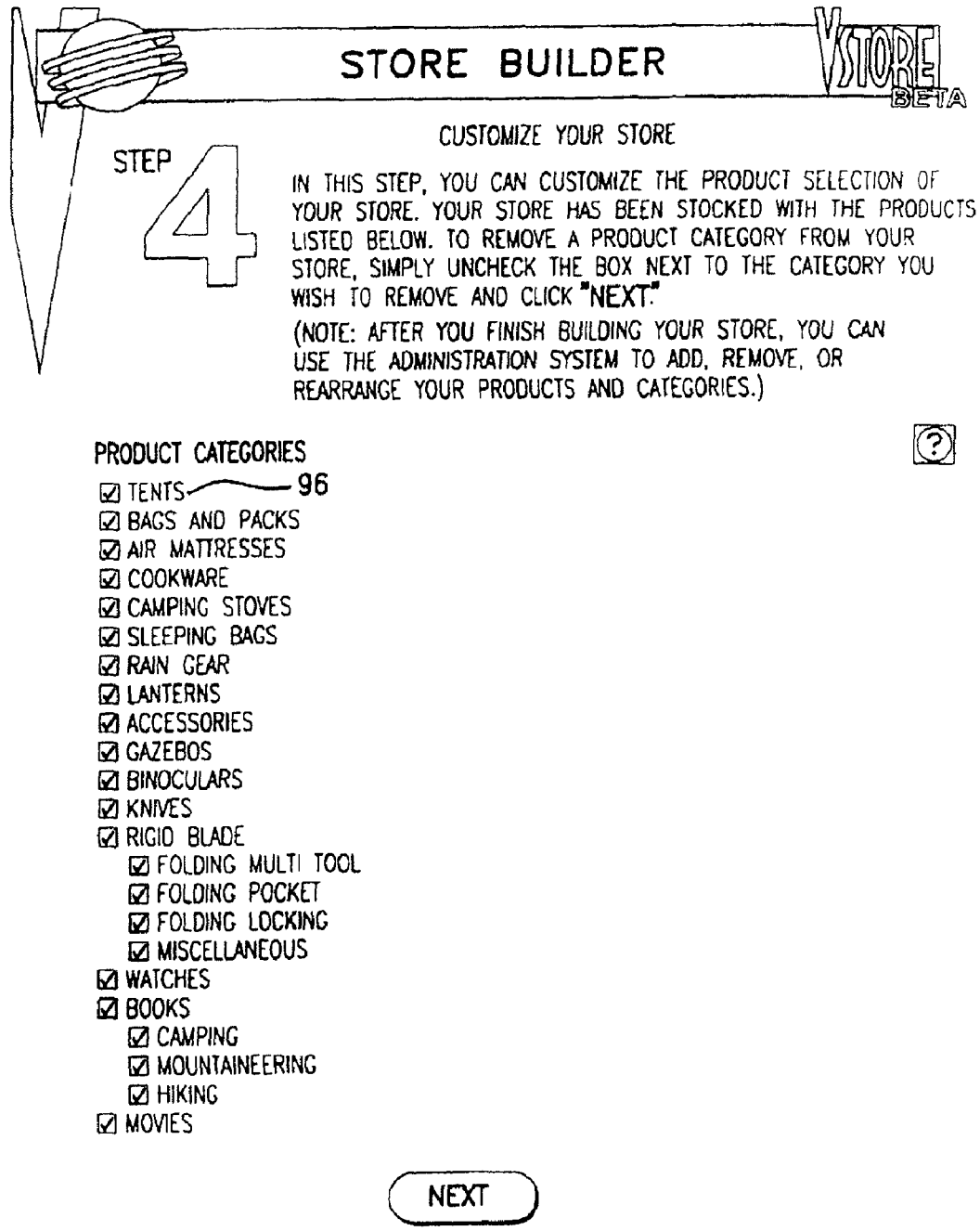
FIG. 10 textually illustrates a number of unique identification tags that may comprise an exemplary customized e-commerce store.

A second customization screen, illustrated in FIG. 10, identifies all products that the host considers should be present in the proposed customized stores. Each different item 96 has been assigned a unique identification tag, such that all tents have the same identification tag, no matter which distributor provides that tent Likewise, each air mattress has the same identification tag that is different than the identification tag for tents. By selecting or deselecting 98 items, the customized store may be further refined to sell only a few of the selected goods. In addition, alternative goods, having been assigned unique identification tags in others of the customized stores may be added to the product category.

Examples of items 96 include the following:
Product Categories
Tents
Bags And Packs
Air Mattresses
Cookware
Camping Stoves
Sleeping Bags
Rain Gear
Lanterns
Accessories
Gazebos
Binoculars
Knives
Rigid Blade
    Folding Multi Tool
    Folding Pocket
    Folding Locking
    Miscellaneous
Watches
Books
    Camping
    Mountaineering
    Hiking
Movies Text block 98 reads as follows: "In this step, you can customize the product selection of your store. Your store has been stocked with the products listed below. To remove a product category from your store, simply uncheck the box next to the category you wish to remove and click "next" (Note: After you finish building your store, you can use the administration system to add, remove, or rearrange your products and categories).

Referring back to FIG. 5, the store owner is finally prompted to provide a commission address 100 where earned commissions may be either mailed or credited to an appropriate bank account.

With reference to FIG. 3, operation of the electronic commerce system 26 is described in more detail. The store owner 36 communicates 38 with the host 32 to build the customized store 40. A single store owner may have multiple stores 40, 401 and the host 32 supports stores 102 owned by additional store owners. It is estimated that each customized store requires between 10 thousand bytes and 100 megabytes of computer memory to establish and maintain, dependent on complexity and that one terabyte of memory will support up to one million customized stores.

Store owner 36 may display products and services other than the customized store 40 to consumers 12. For example, store owner 36 may operate a website drawn to New England camping including maps and weather forecasts. A consumer 12 interested in New England camping may communicate 104 with the store owner 36 to learn more about New England camping. Store owner 36 may then provide a direct communication link 106 to customized store 40 for New England camping site visitors interested in purchasing camping materials.

Communication link 104 may also be used by the store owner 36 to market the products contained in customized store 40 or otherwise assist in increasing the number of store visitors.

If a consumer decides to purchase goods, that information is communicated 48 to host 32. If the goods purchased include personalized goods 108, that information is communicated to store owner 36. Payment for the goods is received by host 32 and the order placed and filled with the appropriate distributor, for example $17^i$. The goods are then shipped 42 to consumer 12. After distributor $17^i$ is paid, the store owner 36 is credited with a commission. While commissions can be paid on a sale by sale basis, it is envisioned that quarterly payments will be more economical. In addition, if the commissions do not reach a certain threshold, for example, ten dollars, payment may be deferred to save money.

After payment to distributor and payment of commission to store owner, the remainder of the purchase price is retained by the host owner to maintain the host site and as the host owner's profit.

In addition to the goods offered through customized store 40, store owner 36 may market personalized goods 108 through its own web site, with the host 32 attending to the administrative details. The host 32 communicates to store owner 36 if any personalized goods 108 are to be shipped to consumer 12.

Utilizing the previously assigned password, the store owner 36 may contact the host 32 at any time and access the administration portion. The store owner may then change the store design or the mix of items sold. The store owner may access a list of items sold to determine what is selling and what isn't. In addition, the store owner may access a commission report to determine the present level of earned commission.

While particularly described in terms of store owner 36 being substantially invisible to consumer 12, store owner 36 could maintain a web site receiving heavy traffic, but limited revenues, for example, a site maintained by a national news organization. The e-commerce system 26 of the invention supports a customized store 40 selling private label goods for such a heavy traffic customer. For example, the store 40 may offer books and videos of interest to people who tend to log onto news sites. Customized portion 110 may offer mugs, hats and other memorabilia associated with that national news organization.

Host 32 would handle the entire back-end including order fulfillment, transaction processing, customer service and returns. In any of the above embodiments, the host may be discernable to the consumer through the administrative process or, alternatively, indiscernible by application of a store owner's private label to these back-end activities.

Other than a straight commission as noted above, the purchase price may be subject to a different type of revenue sharing formula and pricing may be set, in controlled environments, by the store owner rather than the host administrator.

It is apparent that there has been provided in accordance with this invention an e-commerce system that benefits the individual store owner. While this invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed as new and desired to be protected by Letters Patent of the United States is:

1. An electronic commerce storefront system, the system comprising:
    (a) a host, configured for operation by a host owner, suitably adapted for two-way electronic communication between the host owner and a plurality of distributors, the host providing access to a plurality of products for sale electronically from a plurality of different distributors, the host adapted to transmit electronic orders to the plurality of distributors in response to purchase requests received;
    (b) a store builder web site, adapted to configure an electronic store in response to input from a store owner during access to the store builder web site, to create an electronic store managed by the host for the store owner, said electronic store to provide each of a plurality of consumers the ability to purchase at least one merchandise item selected from the plurality of products, the host presenting a web page to the plurality of consumers when the electronic store is accessed, the electronic store configured to receive and transmit to the host electronic orders directly between the respective ones of the plurality of consumers and the electronic store;
    wherein the creation of the electronic store, during access to the store builder website by the store owner, comprises:
    receiving one or more selections from the store owner for customization of the appearance of the store;
    receiving a store name from the store owner;
    receiving from the store owner an identification of a plurality of products to be offered in the store; and
    assigning a new URL for access to the store by each of the plurality of consumers.

2. The system of claim 1 wherein the store owner is presented with a store preview via the store builder web site resembling the electronic store, prior to the creation of the electronic store.

3. The system of claim 1 wherein the store owner selects categories of products that will be included in the electronic store.

4. The system of claim 1 wherein an automated process assigns product codes to the plurality of products based on keywords and an electronic characterization of the keywords.

5. The system of claim 1 wherein the store owner uploads a graphic to the store builder web site and the graphic is integrated into the electronic store.

6. The system of claim 1 wherein the host provides selectable URLs, and the new URL is selected from the selectable URLs.

7. The system of claim 1 wherein at least a portion of the plurality of products to be offered in the store are selected from the plurality of products for sale electronically from a plurality of different distributors.

8. The system of claim 1 wherein the store owner is one of the plurality of different distributors.

9. An electronic commerce storefront system, the system comprising:
    a host providing a store builder website wherein:
    the store builder website is configured to create an electronic store at the request of a store owner,
    the electronic store is managed by the store owner,
    the electronic store provides access to a subset of a plurality of merchandise items for sale electronically,
    the plurality of merchandise items is provided by a plurality of distributors,
    the electronic store receives orders for merchandise items of the plurality of merchandise items from consumers,
    the orders are processed by the host electronically,
    the orders are forwarded electronically by the host to one of the plurality of distributors corresponding to the merchandise items selected, and
    the electronic store is provided a new URL;
    the store owner being one of the plurality of distributors;
    during access to the store, the owner providing a store name, selections for the customization of the electronic store, a selection of the new URL, and an identification of the subset of the plurality of merchandise items;
    two-way electronic communication between the host and the plurality of distributors, wherein the host automatically generates requests and messages based on input from the store owner, consumers, and the plurality of distributors; and
    electronic accounting of amounts paid to the store owner and the plurality of distributors for the orders for merchandise items.

10. The system of claim 9 wherein the store owner is presented with a store preview via the store builder web site resembling the electronic store, prior to the creation of the electronic store.

11. The system of claim 9 wherein the store owner selects categories of products included in the electronic store.

12. The system of claim 9 wherein an automated process assigns product codes to a subset of the plurality of merchandise items based on keywords and an electronic characterization of the keywords.

13. The system of claim 9 wherein the store owner uploads a graphic to the store builder web site and the graphic is integrated into the electronic store.

14. The system of claim 9 wherein the host provides selectable URLs, and the new URL is selected from the selectable URLs.

* * * * *